US008605351B1

(12) United States Patent
Wang (10) Patent No.: US 8,605,351 B1
(45) Date of Patent: Dec. 10, 2013

(54) TRANSPARENT INTERFEROMETRIC VISIBLE SPECTRUM MODULATOR

(75) Inventor: Andrew Wang, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/534,049

(22) Filed: Jun. 27, 2012

(51) Int. Cl.
*G02B 26/00* (2006.01)
(52) U.S. Cl.
USPC .......................................... 359/291; 359/290
(58) Field of Classification Search
USPC .................................................. 359/290–296
See application file for complete search history.

(56) References Cited

U.S. PATENT DOCUMENTS

| 5,835,255 | A  | * | 11/1998 | Miles | 359/291 |
| 7,847,999 | B2 | * | 12/2010 | Lee et al. | 359/247 |
| 8,009,346 | B2 | * | 8/2011 | Cheong et al. | 359/290 |
| 8,035,884 | B2 | * | 10/2011 | Miles | 359/291 |

* cited by examiner

*Primary Examiner* — Mohammed Hasan
(74) *Attorney, Agent, or Firm* — Kyle Eppele; Stephen E. Baldwin; Peter A. Lipovsky (57) ABSTRACT

The visible spectrum modulator makes use of thin film conductive oxides and air gaps to reflect colors of certain wavelengths, achieving transparency due to the transparent nature of conductive oxides and via electrostatic pull-in to reduce the air gaps.

16 Claims, 12 Drawing Sheets

Figure 1

ON reflect Green

Air gap is
Wavelength/4
ie 132nm for green

SiO2 thickness
is wavelength/4
Ie 92nm

The LCD is opaque now,
insuring that the light source
Is from the top.

OFF transparent

All thicknesses
Are now wavelength/2,
Because the SiO2 layers
Are stacked together now
Except first one.
And the LCD is transparent now
Letting light through.

Process Flow

1mm Glass or PEN

Figure 6 Step 1 Substrate

Process Flow

Deposit ½ wavelength ITO

Figure 7   Step 2

Process Flow

Deposit ¼ wavelength $SiO_2$

Figure 8   Step 3

Process Flow

Pattern SiO$_2$, ITO
Deposit 0.5μm Sacrificial Layer

Figure 9   Steps 4-5

Process Flow

Pattern Sacrificial Layer
Deposit SiO$_2$

Figure 10   Steps 6-7

Process Flow

Deposit ¼ wavelength $SiO_2$/PEN

Figure 11  Step 8

Process Flow

These ITO electrodes
Are used to adjust
The gap to quarter
Wavelength. Future
Designs would use
These outer electrodes
To pull in to a spacer.
The inner electrodes
Would pull in all the way.

Deposit ½ wavelength ITO
Pattern ITO

Figure 12  Steps 9-10

Process Flow

Deposit Glass/PEN
Deposit ½ wavelength ITO
Pattern ITO

Figure 13  Steps 11-13

Process Flow

Deposit 0.5μm Sacrificial Layer
Pattern Sacrificial Layer
Deposit SiO$_2$
Deposit ¼ wavelength Glass/PEN

Figure 14  Steps 14-17

Process Flow

Deposit ½ wavelength ITO
Pattern ITO
Deposit Glass/PEN

Figure 15  Steps 18-20

Process Flow

Deposit ½ wavelength ITO
Deposit ¼ wavelength SiO$_2$

Figure 16  Steps 21-22

Process Flow

Remove Sacrificial Layer

Figure 17 Step 23

TRANSPARENT INTERFEROMETRIC VISIBLE SPECTRUM MODULATOR

FEDERALLY-SPONSORED RESEARCH AND DEVELOPMENT

This invention (Navy Case NC 101,107) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

BACKGROUND OF THE INVENTION

The present invention relates to a transparent visible spectrum modulator and more particularly to a transparent interferometric visible spectrum modulator.

Current display technologies vary from liquid crystal (LCD), interferometric modulator (IMOD), and light emitting diodes (LED). All of these technologies reflect color but none of them are transparent.

Transparent displays have been created using organic light emitting diodes (OLED). However, these consume much more power than any other technologies (LCD, IMOD, LED) and OLED manufacturing is more expensive than the other technologies because the fabrication methods are not widely used.

SUMMARY OF THE INVENTION

In one embodiment, a visible spectrum modulator includes wavelength/4 transparent dielectric layers corresponding to a specific color range where the dielectric layers have a relatively low index of refraction which is greater than the index of refraction of air. The modulator further includes wavelength/2 thin film transparent conductive oxide layers with a high index of refraction relative to the dielectric index of refraction. A first wavelength/4 transparent dielectric layer is formed with a first wavelength/2 transparent conductive oxide layer to form a dielectric/oxide pair of layers. A flexible transparent substrate layer, which includes glass springs, is formed between a first dielectric/oxide pair and a second, complementary dielectric/oxide pair. The modulator includes a glass-type substrate formed with a dielectric/oxide pair. Wavelength/4 air gaps between the flexible substrate and the glass-type substrate provide for a reflective state for light rays of the specific color range in the visible spectrum and stacking the dielectric/oxide layers together to pull in the air gaps provides for a transparent state for light rays in the visible spectrum. Constructive interference occurs to reflect the light rays in the reflective state and destructive interference occurs to transmit the light rays in the transparent state. The modulator can include multiple layers of the flexible substrate and dielectric/oxide pairs

BRIEF DESCRIPTION OF THE DRAWINGS

The invention will be more fully described in connection with the annexed drawings, where like reference numerals designate like components, in which.

DETAILED DESCRIPTION OF THE EMBODIMENTS

One purpose of this invention is to realize a transparent visible spectrum modulator for use in a display that will display a color image while allowing the user to look through the display or as an optical switch.

The present invention is a desirable alternative to transparent OLED displays. The present invention makes use of thin film conductive oxides and air gaps to reflect colors of certain wavelengths, achieving transparency due to the transparent nature of conductive oxides and via electrostatic pull-in to reduce the air gaps. The present invention also uses standard semiconductor fabrication methods, allowing for mass production at a low cost relative to OLEDs. The present invention only draws enough current to pull-in the electrodes, typically on the order of nanoamps (which makes it the most efficient technology so far in terms of power consumption).

The present invention can be used as a display that will display a color image or remain transparent to allow the user to see through the device. The present invention could also be used as an optical switch.

Figure 1:
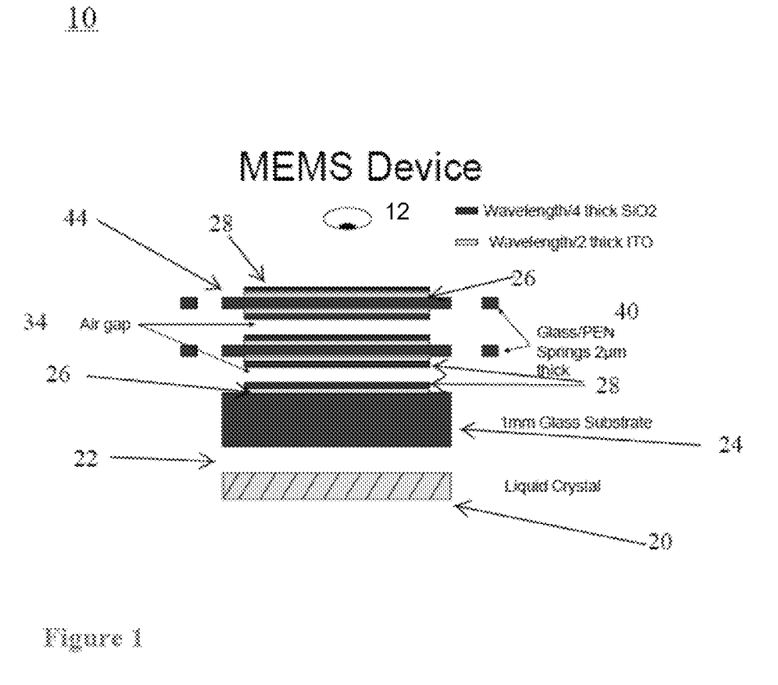
FIG. 1 shows a schematic of an example MEM device of the present invention.
Figure 2:
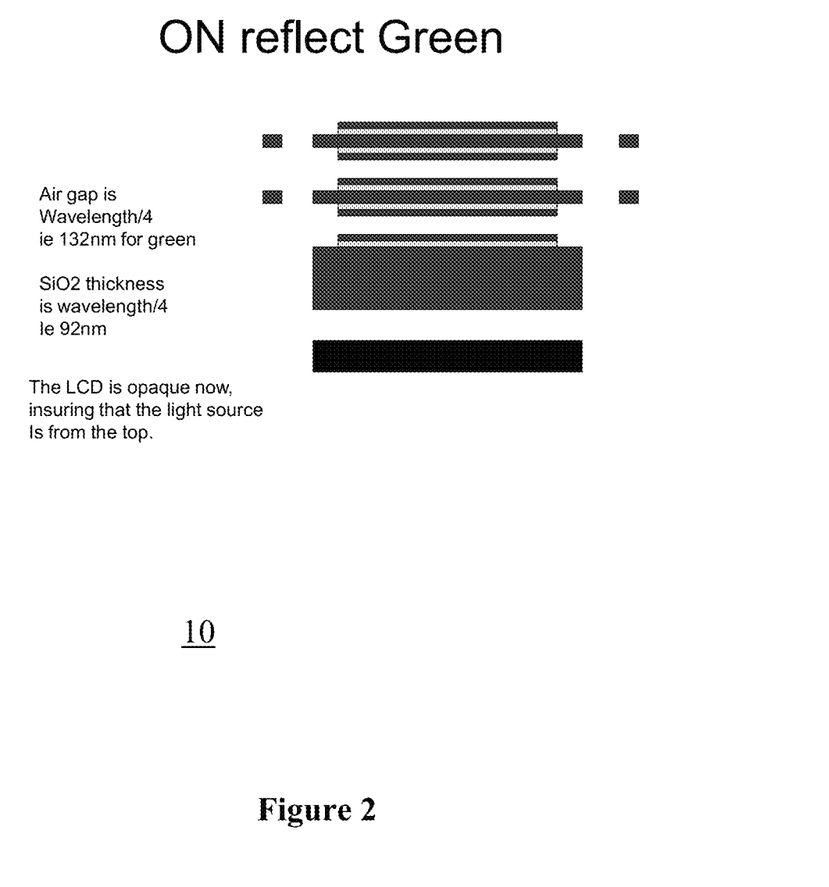
FIG. 2 shows an example ON state of the device of the present invention.
Figure 3:
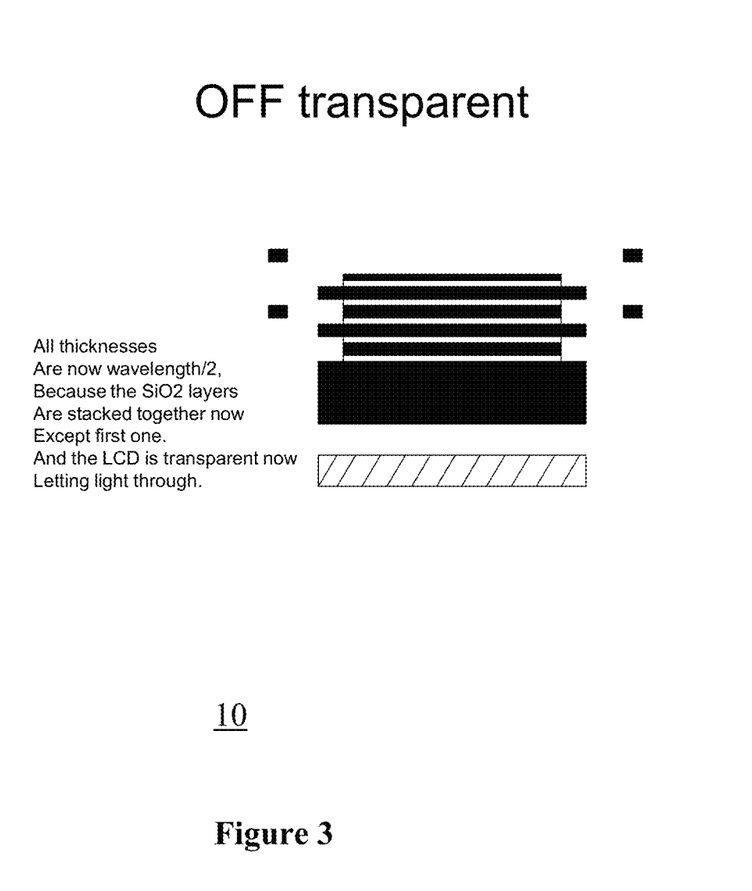
FIG. 3 shows an example of an OFF state of the present invention.

FIG. 1 shows a schematic of an embodiment of a MEMS (Micro-Electro-Mechanical Systems) device 10 of the present invention as perceived by a viewer 12, FIG. 2 shows an example ON state of the device of the present invention, and FIG. 3 shows an example of an OFF state of the present invention.

In one embodiment of the present invention which is shown in FIGS. 1-3, the MEMS device 10 includes a glass-type substrate 24 (e.g., either glass or polyethylene naphthalate (PEN)), with thin film layers 26 of a transparent conductive oxide with a high index of refraction relative to the dielectric used, like indium tin oxide (ITO), and transparent dielectric layers 28 with a relatively low index of refraction but greater than the index of refraction of air, like silicon dioxide ($SiO_2$).

The MEMS device 10 shown in FIG. 1 includes an optional liquid crystal 20 with a 1 mm glass substrate 24 above the liquid crystal 20. The SiO₂ dielectric layers 28 in FIG. 1 have a wavelength/4 thickness, and the ITO thin film layers 26 have a wavelength/2 thickness. Air gaps 34, 22 are shown in FIG. 1 between the respective layers 28. The thickness of the air gaps 34 are wavelength/4, such as 132 nm for the color green.

The glass/PEN springs (or spring elements) 40 are 2 μm in thickness. The function of the glass/PEN springs 40 is to act as a substrate for the quarter wavelength thin film layers. The springs 40 suspend the thin film layers above the air gap. The thickness is 2 μm thick because then the light will not constructively or destructively interfere since 2 μm is much greater than the wavelength of visible light.

Layer 44 is a flexible, transparent substrate layer, which also serves as an antireflection coating to get the most amount of light to enter the device 10.

Layer 20 is an optional liquid crystal layer and is not necessary for the device 10 to change color. However, the liquid crystal layer 20 can serve to block out light completely.

Layer 22 is an air gap and does not affect the system as long as the air gap is bigger than the particular wavelength of light of interest.

The dielectric layers 28 are chosen to destructively interfere when there is an air gap because the stacks are quarter wavelength thick. When the air gap 34 is removed (by pulling in the conductive oxide layers via electrostatic pull in) the oxide layers 26 now add together to be half wavelength thick, which causes constructive interference with transmitted light rays, resulting in reflection.

According to one embodiment, where in one state or mode of operation, the quarter wavelength thick layers (dielectric, conductive oxide, and air) combine to destructively interfere, resulting in no reflection (transparency). In another state/mode, the quarter wavelength thick layers are stacked on top of each other to create a half wavelength thick layer for constructive interference. This process is what causes the color change.

FIGS. 2 and 3 show a simple electrostatic pull-in quarter wavelength thin films. FIG. 2 shows a reflection state for the color green, where the air gaps 34 are shown with 132 nm spacing, and FIG. 3 shows a transparent state, where the air gaps 34 have been electrostatically pulled in with no air gap spacing.

In the example shown in FIG. 2, the air gaps 34 are of wavelength/4 in thickness-for example, 92 nm for the color green. The LCD 20 is opaque, insuring that the light source is from the top.

FIG. 3 shows a transparent state, where electrostatic pull in of the air gaps 34 has occurred. As seen in FIG. 3, all thicknesses are now wavelength/2, because the SiO₂ layers are stacked together, except the first one, and LCD 20 is transparent now, letting light through the device 10.

The following section describes the operation of one pixel of the proposed display in conjunction with FIGS. 1-3. When a user wants to reflect a certain color in a reflective mode, the user blocks the backside light using the liquid crystal. Then set the air gaps of the MEMS device to wavelength/4, with wavelength being the color desired to be reflected in the reflective mode. In order for the device to look transparent in a transparent mode, the thin films are pulled in electrostatically so that there is no air gap.

This changes the thicknesses of SiO₂ from wavelength/4 to wavelength/2, which will allow the visible spectrum light to pass through. An example "on" and "off" states are in FIGS. 2 and 3.

As shown in FIG. 2, the air gap is wavelength/w (i.e., 132 nm for the color green). The SoO₂ thickness is wavelength/4 (i.e., 92 nm). In FIG. 2, the LCD is opaque, ensuring that the light source is from the top.

In FIG. 3, all thicknesses are now wavelength/2, because all the SiO₂ layers are now stacked together, except for the first layer. The LCD is now transparent, allowing for light to pass through.

In FIGS. 1-3, a wavelength/4 transparent dielectric layer 28 corresponding to a specific color range (e.g., green in this example) is formed with a wavelength/2 transparent conductive oxide layer 26 corresponding to that specific color range to form a dielectric/oxide pair of layers 28, 26.

As shown in FIG. 1, a first dielectric/oxide pair 28, 26 is formed on the top surface of each flexible substrate 44, and a second, complementary dielectric/oxide pair 28, 26 (or oxide/dielectric pair 26, 28) is formed on the bottom surface of each flexible substrate 44. Another dielectric/oxide layer 28, 26 is formed on the top surface of glass substrate 24.

Multiple layers of substrate layers 44 and dielectric/oxide pairs 28, 26 with corresponding air gaps 34 as shown in FIG. 1 provide for better operation of the device 10.

Figure 4:
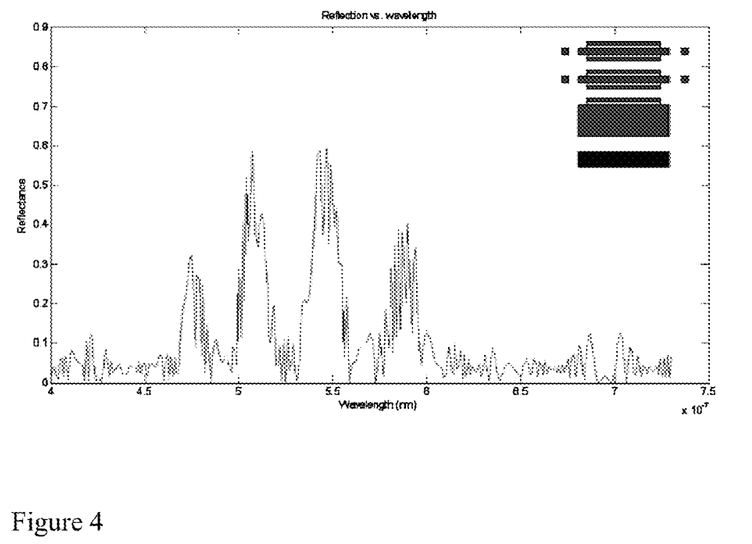
FIG. 4 shows an example of a color state.
Figure 5:
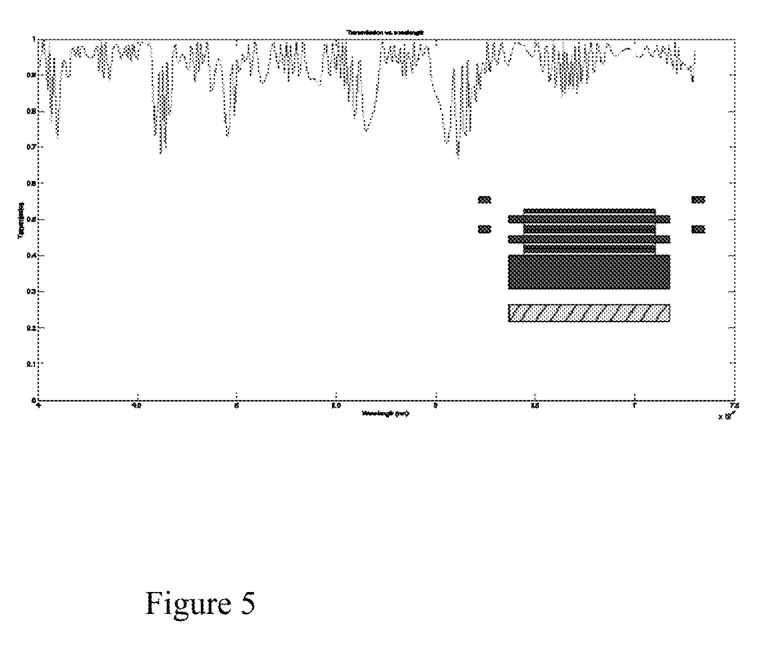
FIG. 5 shows an example of a transparent state.

Simulations using standard reflection/transmission matrices on the device were run to verify its operation. An example color state is shown in FIG. 4, and an example transparent state is shown in FIG. 5. In FIG. 4, which shows reflection vs. wavelength, the color reflected is green, as the reflection magnitude is shown higher around 500-550 nm wavelength, which is consistent with the color green. In FIG. 5, which shows transmission vs. wavelength, the example shown is a transparent state, where the transmission level is shown consistently high across the wavelength spectrum.

A process flow of an example fabrication method is shown in FIGS. 6-17.

As described above, the device uses either a glass or polyethylene naphthalate (PEN) substrate with thin films of a transparent conductive oxide with a high index of refraction relative to the dielectric used, like indium tin oxide (ITO), and a transparent dielectric with a relatively low index of refraction but greater than the index of refraction of air, like silicon dioxide (SiO₂).

Figure 6:
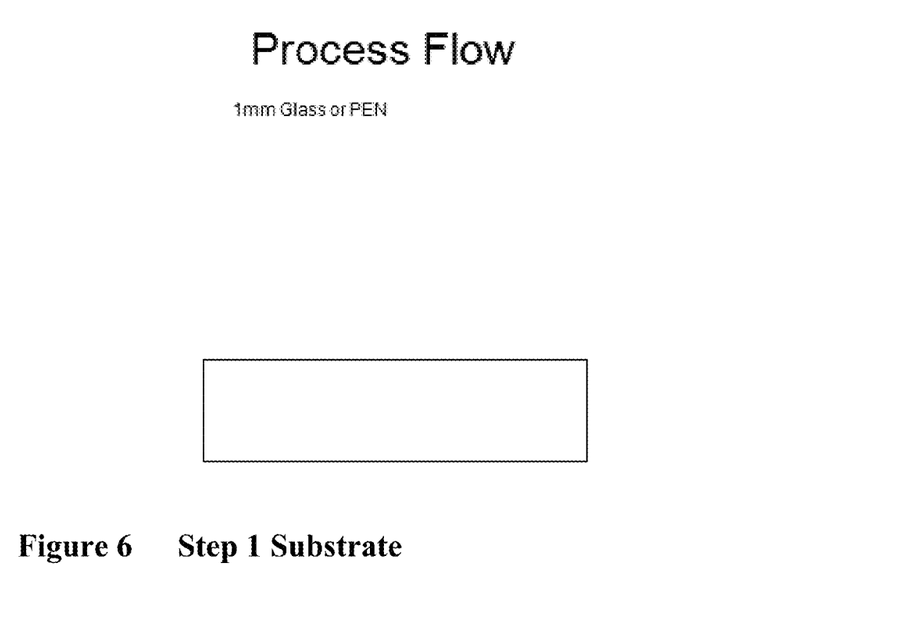
FIG. 6 shows the first step of the process of the present invention.

FIG. 6 shows the first step of the process flow for the present invention, in which a substrate is formed, 1 mm glass or PEN.

Figure 7:
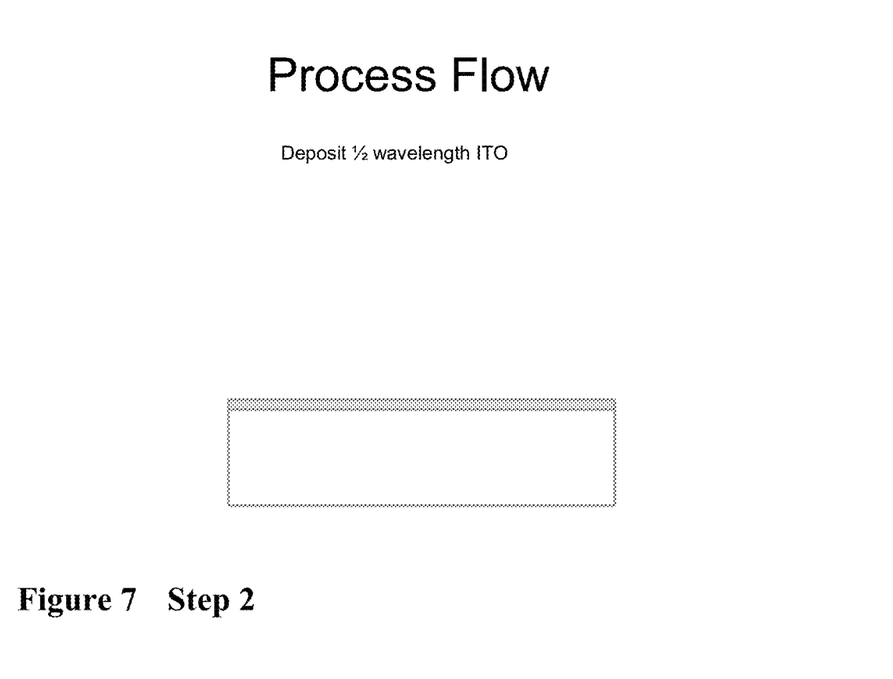
FIG. 7 shows the second step of the process of the present invention.

Next, in FIG. 7 (step 2), a ½ wavelength thick layer of conductive oxide (ITO) is deposited on the substrate.

Figure 8:
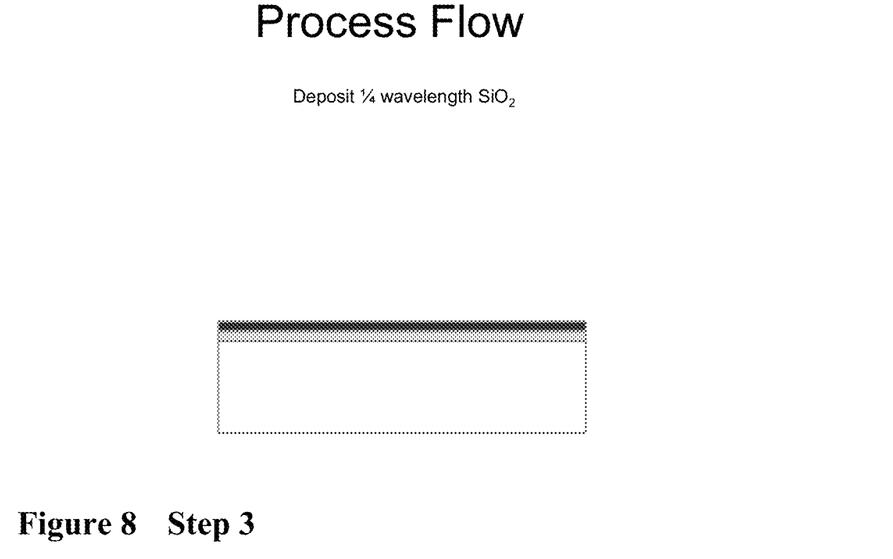
FIG. 8 shows step three of the process of the present invention.

Then, in FIG. 8 (step 3), a ¼ wavelength thick layer of dielectric (SiO₂) is deposited on the substrate.

Figure 9:
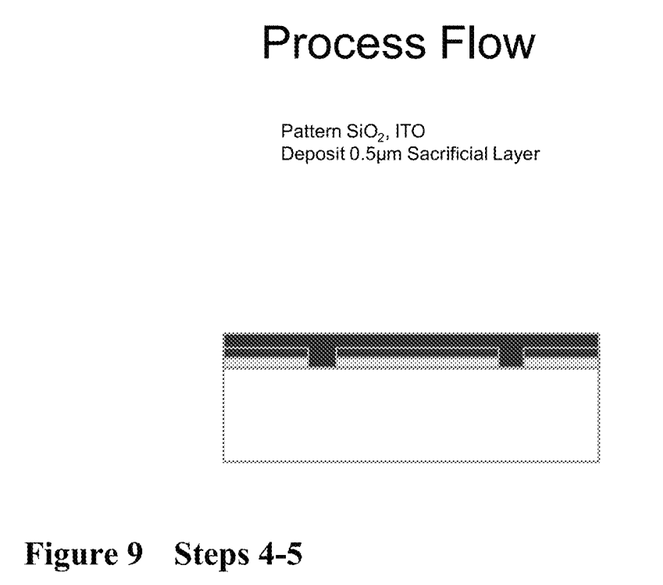
FIG. 9 shows step four and five of the process of the present invention.
Figure 10:
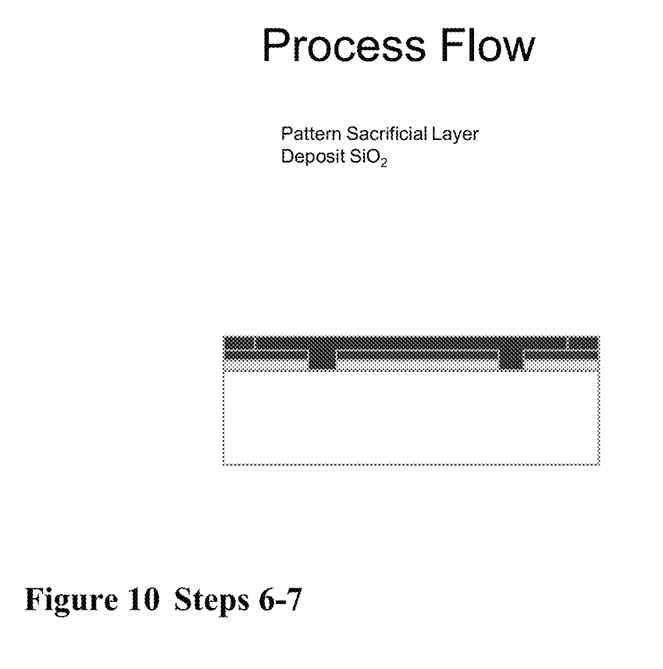
FIG. 10 shows the step six and seven of the process of the present invention.

Then, in FIG. 9 (steps 4-5) and FIG. 10 (steps 6-7), both the dielectric and the conductive oxide are patterned to form electrodes, and a sacrificial layer (0.5 μm) that forms the air gap is deposited, planarized, and patterned. A spacer dielectric of the same thickness as the sacrificial layer is used to fill in the pattern etched in the sacrificial layer.

Figure 11:
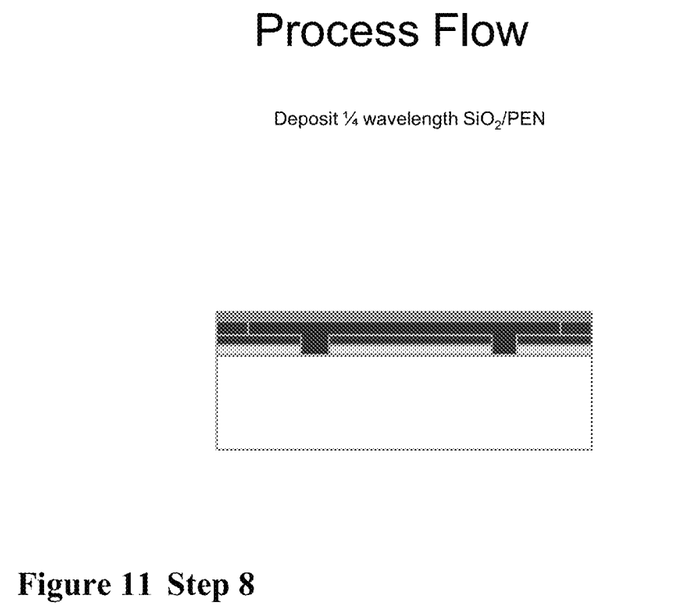
FIG. 11 shows step eight of the process of the present invention.

Then, in FIG. 11 (step 8), a ¼ wavelength of dielectric, SiO₂ or PEN, is deposited.

Figure 12:
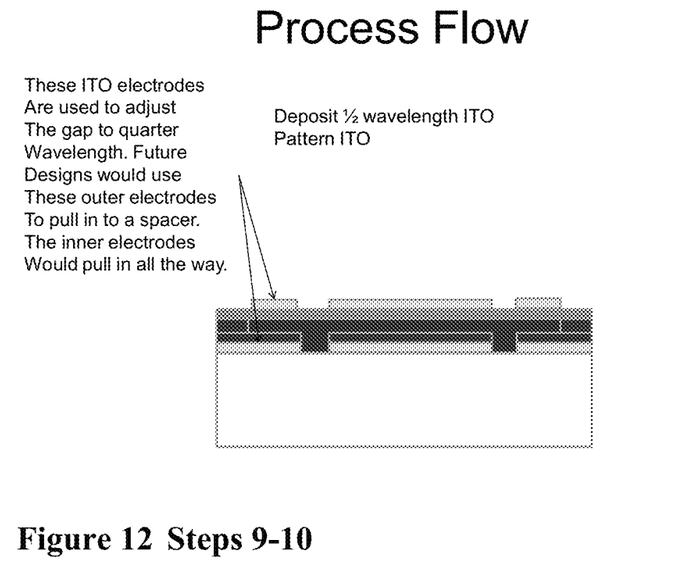
FIG. 12 shows steps nine and ten of the process of the present invention.

In FIG. 12 (steps 9-10), a ½ wavelength thick layer of conductive oxide is deposited and patterned. This forms the accompanying electrodes to the previous electrodes.

In FIG. 12, the ITO electrodes are used to adjust the gap to quarter wavelength. Other designs could these outer electrodes to pull in a spacer. The inner electrodes would pull in all the way.

Figure 13:
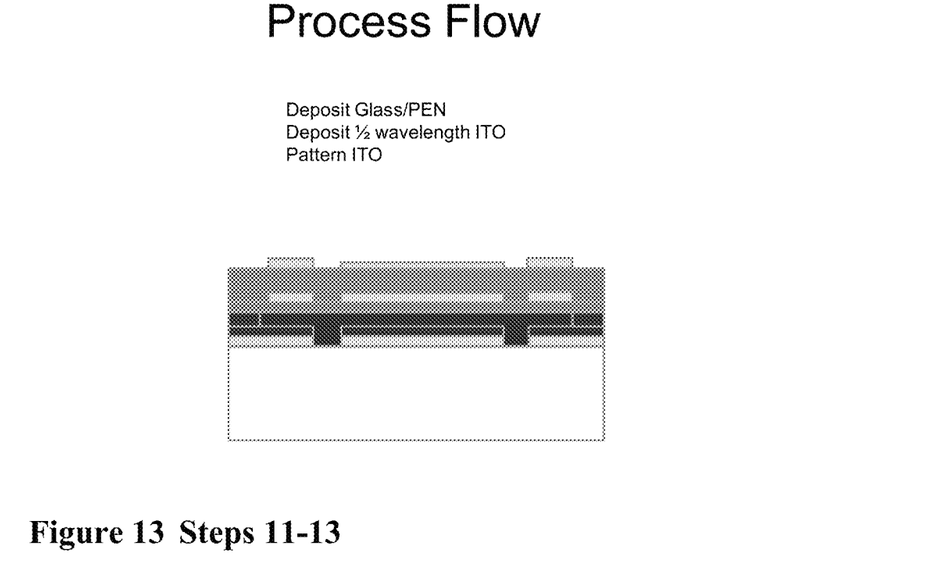
FIG. 13 shows steps eleven through thirteen of the process of the present invention.

Then, in FIG. 13 (steps 11-13), a thick layer of either SiO₂ or PEN is deposited, patterned, and planarized to form the spring layer.

Then a ½ wavelength thick layer of conductive oxide (ITO) is deposited.

Then a ¼ wavelength thick layer of dielectric is deposited.

Then the layer of conductive oxide and dielectric is patterned to form a third set of electrodes.

Figure 14:
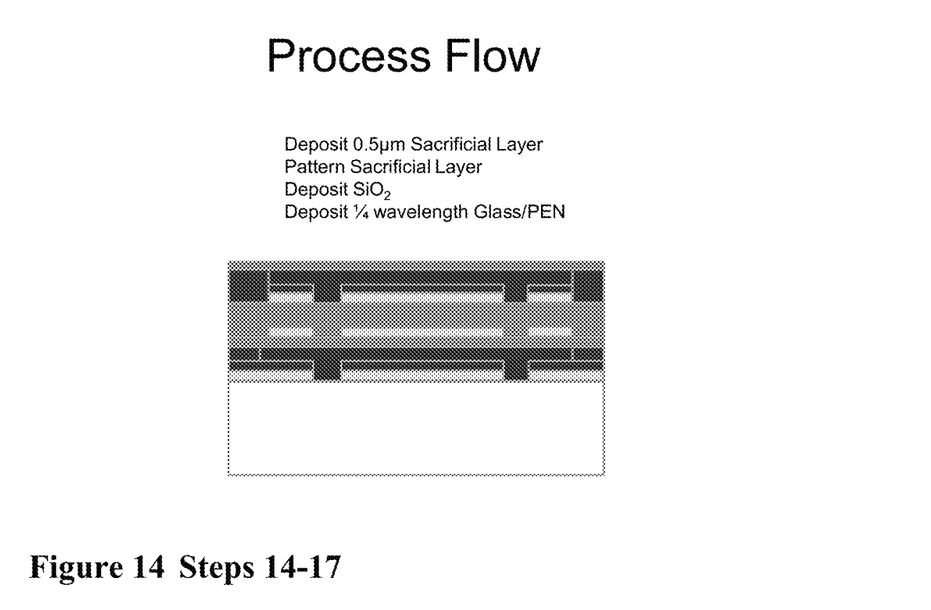
FIG. 14 shows steps fourteen through seventeen of the process of the present invention.

Next, in FIG. 14 (steps 14-17), a sacrificial layer (0.5 μm) that forms the second air gap is deposited, planarized and patterned.

Then a spacer dielectric of the same thickness as the sacrificial layer is used to fill in the patterned etched in the sacrificial layer.

Then a ¼ wavelength of dielectric, SiO$_2$ or PEN, is deposited, then a ¼ wavelength of glass/PEN is deposited.

Figure 15:
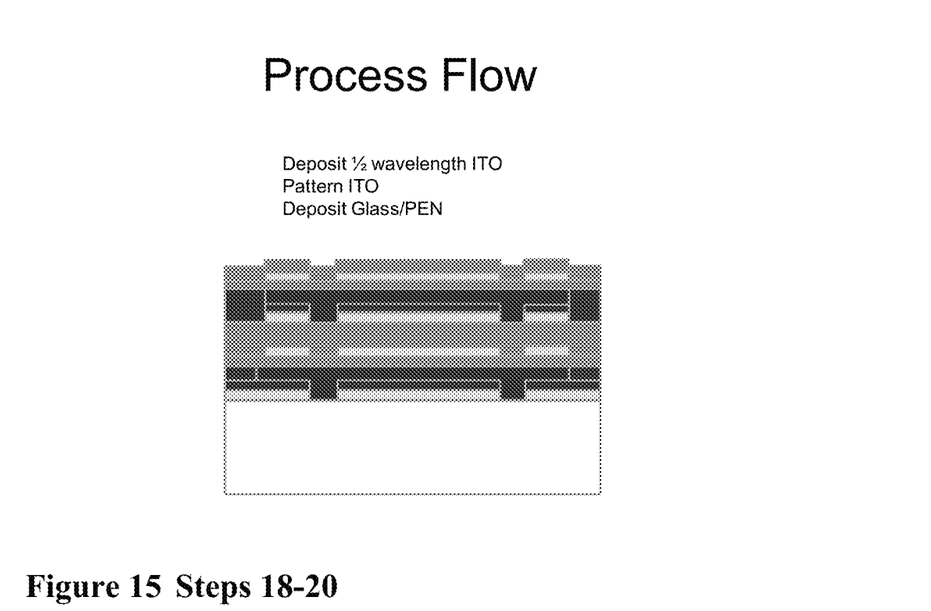
FIG. 15 shows steps eighteen through twenty of the process of the present invention.

Then, in FIG. 15 (steps 18-20), a ½ wavelength of conductive oxide is deposited and patterned.

Then a second spring layer of SiO$_2$ or PEN is deposited, patterned, and planarized.

Figure 16:
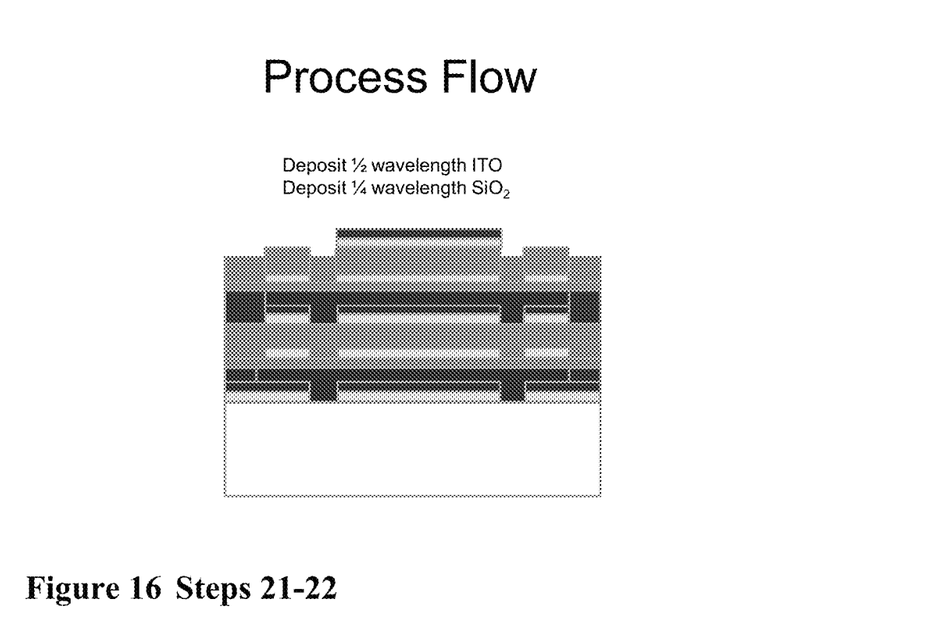
FIG. 16 shows steps twenty-one and twenty-two of the process of the present invention.

Next, in FIG. 16 (steps 21-22), a ½ wavelength layer of conductive oxide is deposited.

Then a ¼ wavelength layer of dielectric is deposited.

Then, the dielectric and conductive oxide are patterned.

Figure 17:
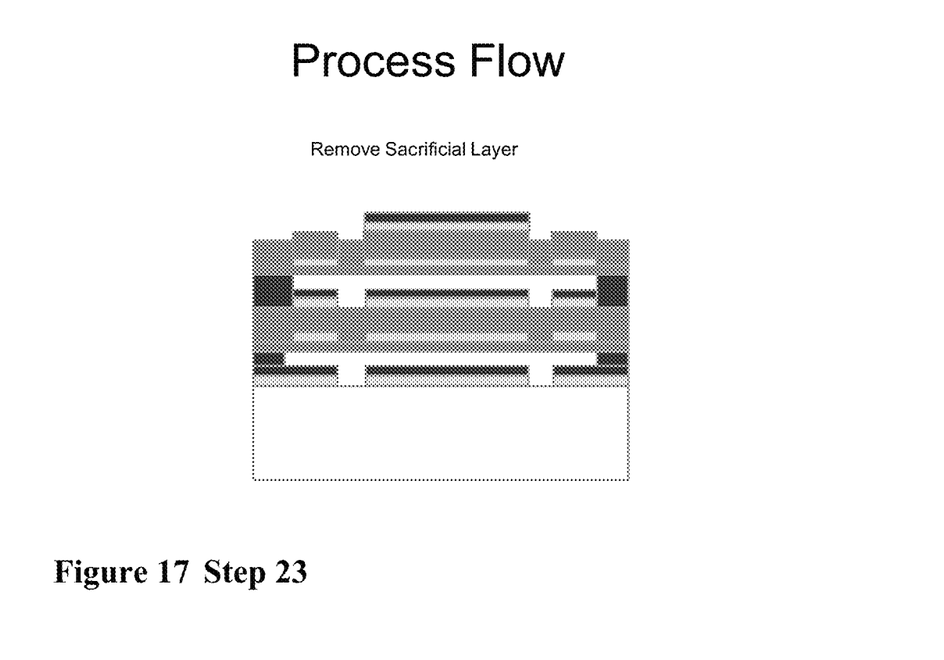
FIG. 17 shows step twenty-three of the process of the present invention.

The last step in FIG. 17 (step 23) is to release the structure by etching the sacrificial layers.

From the above description, it is apparent that various techniques may be used for implementing the concepts of the present invention without departing from its scope. The described embodiments are to be considered in all respects as illustrative and not restrictive.

For instance, instead of using a sacrificial layer, wafer bonding can also be used to create the air gap. The device is transparent, which is an additional feature over LCD, LED, and IMOD display technologies. The device is cheaper to mass produce compared to OLED technology and the device has lower power requirements than OLED technology.

The device can be used as an optical switch and as a color recorder. The device can be made using other conductive oxides such as aluminum doped zinc oxide, indium doped cadmium oxide. The device can be made using multiple stacks of dielectrics and conductive oxides, and the device can be made using multiple air gaps.

It should also be understood that the present invention is not limited to the particular embodiments described herein, but is capable of many embodiments without departing from the scope of the claims.

What is claimed is:

1. A visible spectrum modulator comprising:
wavelength/4 transparent dielectric layers corresponding to a specific color range, the dielectric layers having a relatively low index of refraction which is greater than the index of refraction of air;
wavelength/2 thin film transparent conductive oxide layers with a high index of refraction relative to the dielectric index of refraction;
a first wavelength/4 transparent dielectric layer formed with a first wavelength/2 transparent conductive oxide layer to form a dielectric/oxide pair of layers;
a flexible transparent substrate layer formed between a first dielectric/oxide pair and a second, complementary dielectric/oxide pair, the flexible layer including glass-type springs;
a glass-type substrate formed with a dielectric/oxide pair;
wavelength/4 air gaps between the flexible substrate and the glass-type substrate to provide for a reflective state for light rays of the specific color range in the visible spectrum;
wherein stacking the dielectric/oxide layers together to pull in and completely remove the air gaps and forming λ/2 dielectric layers provides for a transparent state for light rays in the visible spectrum.

2. The modulator of claim 1 wherein constructive interference occurs to reflect the light rays in the reflective state.

3. The modulator of claim 2 wherein destructive interference occurs to transmit the light rays in the transparent state.

4. The modulator of claim 3 including multiple layers of the flexible substrate and dielectric/oxide pairs.

5. The modulator of claim 4 including a liquid crystal display layer for blocking backside light rays.

6. The modulator of claim 4 wherein the glass-type substrate is a glass substrate.

7. The modulator of claim 4 wherein the glass-type substrate is a PEN substrate.

8. The modulator of claim 4 wherein the modulator is a MEMS device.

9. The modulator of claim 4 wherein the modulator is an optical switch.

10. The modulator of claim 4 wherein the modulator is a display for displaying a color image in the reflective state or remains transparent in the transparent state.

11. The modulator of claim 3 wherein the modulator is a color recorder.

12. A visible spectrum modulator comprising:
a first wavelength/4 transparent dielectric layer corresponding to a specific color range formed with a first wavelength/2 transparent conductive oxide layer corresponding to a specific color range to form a dielectric/oxide pair of layers;
a flexible transparent substrate layer formed between a first dielectric/oxide pair and a second, complementary dielectric/oxide pair;
a glass substrate formed with a dielectric/oxide pair;
a wavelength/4 air gap formed between the glass-type substrate and flexible substrate layer to provide a reflective state for light rays of the specific color range in the visible spectrum,
the flexible layer including a spring element responsive to electrostatic pull in for electrostatically pulling in the flexible layer to the glass substrate layer to completely remove the air gap and form λ/2 dielectric layers to provide a transparent state for light rays in the visible spectrum.

13. The modulator of claim 12 including multiple layers of the flexible substrate and dielectric/oxide pairs.

14. The modulator of claim 13 wherein constructive interference occurs to reflect the light rays in the reflective state.

15. The modulator of claim 14 wherein destructive interference occurs to transmit the light rays in the transparent state.

16. A visible spectrum modulator comprising:
a first wavelength/4 transparent dielectric layer corresponding to a specific color range formed with a first wavelength/2 transparent conductive oxide layer corresponding to a specific color range to form a dielectric/oxide pair of layers;
multiple layers of a flexible transparent substrate layer formed between a first dielectric/oxide pair and a second, complementary dielectric/oxide pair;
a glass substrate formed with a dielectric/oxide pair;
wavelength/4 air gaps formed between the glass substrate and the flexible substrate layer and between the multiple layers to provide a reflective state for light rays of the specific color range in the visible spectrum wherein constructive interference occurs to reflect the light rays in the reflective state;

the flexible layers each including a spring element responsive to electrostatic pull in for electrostatically pulling in and completely removing the air gaps and forming $\lambda/2$ dielectric layers to provide a transparent state for light rays in the visible spectrum destructive interference occurs to transmit the light rays in the transparent state.

* * * * *